Patented Sept. 25, 1934

1,974,692

UNITED STATES PATENT OFFICE 1,974,692

PROCESS FOR RESOLVING EMULSIONS

Charles J. Robinson, Claremont, Calif., assignor to L. Blake-Smith, San Francisco, Calif.

No Drawing. Application May 21, 1932, Serial No. 612,855

26 Claims. (Cl. 196—4)

An object of my invention is to provide a new and more efficient method of resolving emulsions and separating intimate mixtures of mutually insoluble liquids.

An object of my invention is to provide a new and more efficient type of agent for the above named purpose.

An object of my invention is to provide a new and more efficient agent for use in that type of treatment in which emulsions or intimate mixtures of mutually insoluble liquids are contacted with finely divided solids which are substantially insoluble in the liquids to be treated and which, so far as is presently known, do not chemically react therewith, the resolution of the emulsion or mixture being produced by purely physical forces.

There is no sharp line of distinction between an emulsion and an intimate mixture of mutually insoluble liquids. An emulsion is an intimate dispersion of one liquid in another, which will not separate and stratify under the influence of gravity. This failure to separate may be due to the extreme fineness of the dispersion, by which the ratio of surface to mass is greatly increased, or to a low interfacial tension between the two liquids, or to lack of sufficient gravity difference, or to excessive viscosity of the continuous phase, or to the presence of foreign bodies (clay or other colloidal solid matter, insoluble soaps, mucilaginous substances, etc.) as a skin or pellicle surrounding the dispersed particles. The relative permanence of the intimate mixtures which are classed commercially as emulsions (which may persist indefinitely or only over a period too long to permit their profitable separation by gravity) may be due to any one or all of these causes, and my invention is designed to separate all such emulsions and mixtures, regardless of the cause of their existence and permanence.

To avoid prolixity I will describe my invention in connection with the resolution of emulsions of petroleum and water, these being better known than others and also being, in many cases, particularly resistant to separation. It will be understood that in so limiting my description I do not thereby limit my invention.

It is well known to break or resolve petroleum and other emulsions by bringing them into contact with insoluble solid bodies. For instance, it is old in the art to pass emulsions through layers of sand or through packs of sawdust, hay or excelsior; to force them through layers of diatomaceous earth accumulated on filter cloth, and to pass them through the pores of water wetted cloth. These methods all produce a separation of water from oil in certain cases but their range of effectiveness is almost entirely limited to the type of emulsion in which water is suspended in relatively large drops in the oil, the resolution of the emulsion being due to the contact of these water droplets with a previously water wetted surface by which they are agglomerated into streams or into drops of sufficient size to settle from the oil. The more obstinate and persistent emulsions in which the dispersed droplets are of microscopic size, in which foreign matter such as clay is present or in which there is a skin of some emulsifying agent surrounding the droplets do not yield to this treatment to such an extent as to produce a commercially valuable result.

It has heretofore been discovered that obstinate oil and water emulsions may be effectively resolved by contacting them with a mixture of grains of two different minerals, one of such minerals being preferentially wetted by oil and the other preferentially wetted by water. In applying this mixed agent, of which a mixture of iron sulfid and silica is an example, the mineral grains are agitated with the emulsion in such manner as to bring them into repeated contact with the suspended water particles with the result that the emulsion skins are ruptured and the released water particles are agglomerated on the more readily water-wetted constituent (silica in this particular instance) into relatively large drops. These drops, originally dispersed through the continuous or oil phase of the emulsion, will spontaneously subside when agitation is discontinued. The method of resolving emulsions with a plural or mixed agent, the constituents of which have opposed properties, is not of my invention and I lay no claim thereto, the subject matter of my invention being an improved agent which may be used singly in a treatment of the same general character.

I have discovered that even the most obstinate emulsions may rapidly be broken by contacting them with relatively finely divided particles of a single solid substance, provided such substance has a much higher adhesion tension for the liquid of the dispersed phase of the emulsion than it has for the liquid of the continuous phase. Inasmuch as the dispersed phase in all obstinate petroleum emulsions is water, a treating material to be of value in resolving such emulsions must have a much higher adhesion tension for water than for oil. In effecting treatment of emulsion in the above described manner, that is, by agitating the solid particles with or otherwise dispersing them through the emulsion, the solid particles are caused to repeatedly collide with the dispersed droplets, the liquid of the droplets adheres to the solid particles and is carried down as they subside through the emulsion, the liquid films coalescing into a continuous body of liquid in the bottom of the retaining vessel.

The efficiency of the treatment depends primarily upon the high adhesion tension between the solid treating agent and the dispersed liquid, which in this case is water. The term "adhesion tension" which I use herein is comparable with the terms "wettability" and "superficial attraction" heretofore used, but is preferable to these terms because it is capable of exact definition and of exact measurement.

Adhesion tension is a measure of the attraction of a solid for a liquid. (Bartel, J. Ind. Eng. Chem., 19, 1278). For mathematical expression, it is the decrease in surface energy which occurs when a unit interface solid-liquid is substituted for a unit interface solid-air. (Bartel, Colloid Symposium Monographs, Vol. V, p. 116, 1927). Such a decrease in surface energy can be measured in terms of work required to displace the liquid from the solid by air, or of work that may be done by the energy released when liquid displaces air.

Bartel measured adhesion tension by measuring the pressure required to prevent displacement of a liquid A adhering to a solid (in powder form) by a liquid B, whose adhesion tension for the solid is greater than that of A. McMillen (E. L., J. Ind. Eng. Chem., 21, 1237. (1929)) measured the pressure required to prevent a liquid from displacing air. In addition to using these two methods, I have found that parallel relative results may be obtained by measuring the heights to which liquid will rise in tubes filled with powdered solids, the lower end of the tubes being immersed in the liquid.

More specifically, dry glass tubes of 3 to 6 mm. internal diameter (results are the same with various diameters) are closed with cotton at one end and filled with powdered solids, then tapped until the powder settles no more. For comparing various solids, it is important that all of them be ground to the same size of particle, in order that capillary forces be equal in all, since capillary attractions are related to the capillary diameters. My measurements have been made with powders passing an 80-mesh screen, but retained on a 100-mesh screen. These powders have been washed thoroughly with water to remove fine dust, then dried completely. When the tubes are filled with the powders, the tips of the closed ends are opened to allow liquid to enter, and the tubes are mounted vertically in shallow containers for liquids. When the liquid comes in contact with the powder, it creeps upward, wetting the powder, and work is done in lifting the liquid against the force of gravity. The height to which the liquid travels up the column of powder is measured in millimeters. The climb of liquid is rapid, in most instances, during the first few hours but continues more and more slowly for many days. The height varies greatly with different solids, as indicated in the table below. All were at the same temperature, 20° C.

*Rise in tubes in 20 hours, in mm.*

|  | Specific rise | | Specific rise ratio |
| --- | --- | --- | --- |
|  | Water | Dehydrated petroleum |  |
| Hematite #50 | 422 | 77 | 5.48 |
| Lepidolite #107 | 438 | 89 | 4.92 |
| Hornblende #115 | 375 | 98 | 3.83 |
| Garnet #72 | 269 | 104 | 2.60 |
| Silica #11 | 140 | 75 | 1.86 |
| Hematite #40 | 90 | 70 | 1.28 |
| Magnetite #62 | 95 | 85 | 1.12 |
| Iron pyrites #1 | 20 | 75 | 0.26 |

Such data will hereinafter be referred to as the "specific rise" of a given liquid in a given powder, and it will be understood that in every case the measurement is made with a powder passing an 80-mesh screen, but retained on a 100-mesh screen, and that such powder has been washed free of fines and then thoroughly dried. The term "specific rise ratio" will be used to denote the ratio of the specific rise of the dispersed liquid of an emulsion to the specific rise of the continuous liquid. For example, the specific rise ratio for silica #11 is 140/75 or 1.86; that for pyrites #1 is 20/75 or 0.26; that for hematite #50 is 422/77 or 5.48; all referring to the water-in-petroleum system. The specific rise ratio is an indication of the relative adhesion tensions of the solid for the two liquids of an emulsion.

The lifting of liquid in the column of powder is obviously work done by the energy released when the liquid displaces air from the surface of the solid. Therefore the relative heights attained by a given liquid in columns of different powders having the same capillary dimensions, and at the same temperature, give a measure of the relative adhesion tensions of the various solids for the given liquid.

It should be noted that adhesion tension is the converse of interfacial tension. High interfacial tension signifies a state of large surface energies, but high adhesion tension leads to the release of large surface energies. It is generally accepted as true that a system of materials will tend to take that form in which the surface energies are the lowest. Hence a high adhesion tension in a system of solids and liquids may become the directing force in a change of surface conditions, or extent of interfaces, such as must occur in the resolution of an emulsion.

In addition to a high adhesion tension with water or other dispersed liquid, a solid suited for use as a single treating agent must have certain other physical properties. For instance, a mere dispersal of the solid throughout the mass of emulsion is not sufficient to produce an effective contact between the solid particles and the water particles. There must be a substantial difference in specific gravity between the solid and the emulsion in order that the former, after being lifted into the emulsion by some applied force, may rapidly settle out and thus produce a relatively rapid movement of the solid particles through the body of emulsion.

It is difficult to fix commercial limitations to effectiveness, but my experiments have indicated that any solid to be commercially valuable as a treating agent for breaking petroleum-water emulsions, must have a specific gravity not substantially less than 3 if the specific rise ratio is not substantially greater than 2.5. A solid with lower specific gravity than 3 may be effective if its specific rise ratio is substantially greater than 2.5. To a lesser extent, a solid whose specific gravity is substantially greater than 3 may be effective even though its specific rise ratio is somewhat less than 2.5.

Furthermore, the solid is preferably of sufficient hardness to resist abrasion in the agitation process. Abrasion of the particles of solid, due to their collisions with each other and with the walls of the container, results in the production of more or less very finely divided (colloidal) solid material acting, if in sufficient quantity, as an emulsifying agent in the system, tending especially to reverse the emulsion or to cause the liquid with the lower adhesion tension for the solid agent to become dispersed in the liquid with higher adhesion tension.

I would therefore define my improved treating agent in the following terms:

(a) Its adhesion tension for the liquid of the dispersed phase must be materially greater than its adhesion tension for the liquid of the continuous phase of the emulsion. To produce a commercially valuable result the specific rise ratio should preferably be not substantially less than 2.5, as determined by the dry tube method above described, unless the specific gravity be substantially greater than three times that of the continous phase of the emulsion.

In the treatment of oil-in-water emulsions all substances so far tested have given a commercially desirable result when the specific rise with water was 200 mm. or over as above defined, and for this particular purpose I may substitute this specific rise for the specific rise ratio which obtains for emulsions in general.

(b) Its specific gravity should preferably be sufficiently high to promote rapid separation of the solid from the liquid of the continuous phase. The specific gravity of the solid agent should be not substantially less than three times the specific gravity of the liquid of the continuous phase, unless the specific rise ratio is greater than 2.5.

(c) It should preferably have sufficient hardness to resist excessive abrasion and the production of excessive amounts of colloidal fines. The solid will not be suitable if the hardness is substantially less than 4 on the well-known scratch scale.

(d) It must be substantially insoluble in the liquid of either phase, that is, it must not suffer material wastage due to solution or chemical reaction while in use.

(e) It may be a mineral, occurring in nature, or an artificial product.

I have found a number of minerals commercially valuable for this purpose among the oxids and the silicates of the metals of the first transitional series, (Latimer & Hildebrand, "Reference Book of Inorganic Chemistry", 1929, page 298). This group of metals comprises titanium, vanadium, chromium, manganese, iron, cobalt, nickel, copper, and zinc. When in the claims I refer to compounds of the metals of the first transitional series, it will be understood that I limit myself to such insoluble compounds of these metals as conform to the above specifications of adhesion tension, specific gravity and hardness.

It should be understood, however, that these compounds do not occur in nature in a state of purity and that purity is not requisite to the effective functioning of the mineral. For instance, hematite, many examples of which are extremely effective demulsifying agents, may be heavily contaminated with silica, metallic sulfids and other substances without materially reducing its demulsifying power and it is my intention to claim not only the pure compounds but also such mixtures of these compounds with foreign materials as occur in nature or as may be artificially prepared from naturally occurring materials. This mineral has all the desired properties for breaking petroleum emulsions—high adhesion tension for the dispersed phase, high specific gravity and ample hardness—and is an outstanding example of the class of substances suited to the practice of my invention.

Other iron oxids such as limonite have in some instances given excellent results; also certain other minerals containing smaller proportions of iron, such as the ferriferous varieties of pyroxene, garnet, and jasper. The determining factor, however, is not the presence of iron, for some specimens of hematite, magnetite, and limonite have low adhesion tensions for water, as indicated in the data cited above (hematite #40) and give correspondingly poor results when used as treating agents for breaking petroleum-water emulsions. Some specimens with high adhesion tensions for water have been found to be too soft to withstand abrasion. Hence it is necessary to define the successful treating agent in terms of definite adhesion tension, and of preferred specific gravity and hardness, rather than in terms of chemical composition.

In applying the treating agent above described I may make use of any known or preferred apparatus for producing intimate contact between the solid grains of treating agent and the particles of the dispersed liquid. Thus, I may disperse the grains through a mass or stream of the emulsion and cause them to continuously or repeatedly pass therethrough by mechanical mixing, as with paddles, or by agitation, as with jets of air or gas, or by circulatory pumping, or by any of the well-known means for producing the movement of relatively heavy solid grains through a relatively lighter liquid. My invention lies in the resolution of an emulsion by contacting with it, in any suitable manner, an agent having certain defined properties, and this I wish to claim as broadly as the state of the art will permit.

It will be understood that when I use the word "emulsion" without qualification, I do not intend to limit myself to emulsions of petroleum with water but intend to include in the term all mixtures of mutually insoluble liquids which, for any reason, will not readily separate and stratify when allowed to stand undisturbed.

The use of certain water-wettable treating agents for petroleum-water emulsions, such as cellulose and silica, have been disclosed in the prior art. I expressly disclaim the use of these materials in the ways in which their use has been previously disclosed, by methods of filtration, or by contacts produced by causing the flow of the liquid emulsion. I find that many samples of natural silica have a low specific rise ratio, which make their use unprofitable in my process. However it is possible to prepare silica artificially, such as silica gel, or to treat natural silica in such a way that it may have the desired properties described above and in that case it may be suitable for my purpose in treating petroleum-water emulsions. For the treatment of certain other emulsions, for example, an emulsion of ethyl alcohol and benzene, natural silica may come within the specifications which I have laid down above and I wish to claim its use as a part of my invention for treating any emulsion to which my specifications apply, since such uses have not been disclosed in the prior art.

As a specific example of the application of my invention, I cite the results of the following experiments, in which the mineral hematite was used as a treating agent in comparison with a clean silica sand of the same mesh.

The same emulsion was used in both these experiments, this emulsion originating on the Murphy Lease in the La Habra oil field in Orange County, California. This emulsion contained 53% of water, of which 5.9% was free and 47% was emulsified, and 0.1% by weight of solids.

In the experiment shown below in Example A the treating agent used was the mineral hematite, in Example B a silica sand. In each experiment 600 cc. of emulsion was used, with 160 grams of the treating agent. Both agents were reduced to the same degree of fineness (40-60 mesh), and washed free from fines. The specific rise ratio of the hematite agent was 3.84, its specific gravity 4.23. The corresponding figures for the sand were 1.75 and 2.61. Each sample was treated for a period of 30 minutes at a temperature of 152° F. in the same kind of apparatus, revolving cylinders of barrel-churn type. Each sample was allowed to settle for a period of 5 minutes at the conclusion of the treatment. The tests were run side by side and the operating conditions were identical in the two experiments and were such as to produce the best results with each of the treating agents.

The results of these two experiments were as follows. It will be noted that in Example A a clean cut separation down to 0.9% centrifuge cut was obtained in 30 minutes' treating, while in Example B this time of treatment left a large proportion of unbroken emulsion. In order to ensure that the failure of the sand to effect a commercial resolution was not due merely to lack of time, this example was retreated in stages, testing after each period of treatment, until a total of two and one half hours had been reached.

*Example A*

After 30 minutes' treating and 5 minutes' settling

| Centrifuge cut— | Per cent |
|---|---|
| Emulsion | 0.8 |
| Sediment | 0.1 |
| Total | 0.9 |

*Example B*

After 30 minutes' treating and 5 minutes' settling

| Centrifuge cut— | Per cent |
|---|---|
| Emulsion | 14.8 |
| Sediment | Trace |
| Total | 14.8 |

After 60 minutes' treating and 5 minutes' settling

| Centrifuge cut— | Per cent |
|---|---|
| Emulsion | 10.4 |
| Sediment | Trace |
| Total | 10.4 |

After 90 minutes' treating and 5 minutes' settling

| Centrifuge cut— | Per cent |
|---|---|
| Emulsion | 8.8 |
| Sediment | Trace |
| Total | 8.8 |

After 150 minutes' treating and 5 minutes' settling

| Centrifuge cut— | Per cent |
|---|---|
| Emulsion | 6.0 |
| Sediment | 0.1 |
| Free water | 0.1 |
| Total | 6.2 |

I claim as my invention:

1. The method of resolving an emulsion which comprises: intimately contacting with said emulsion grains of a solid substance substantially insoluble in any constituent of said emulsion, said substance being a compound of an element of the first transitional series, having an adhesion tension with the liquid of the dispersed phase of said emulsion sufficient to give a specific rise ratio not substantially less than 2.5, and having a specific gravity materially greater than that of the liquid of the continuous phase.

2. The method of resolving an emulsion which comprises: intimately contacting with said emulsion grains of a solid oxid of a metal of the first transitional series substantially insoluble in any constituent of said emulsion, said oxid having an adhesion tension with the liquid of the dispersed phase of said emulsion not substantially less than 2.5 times its adhesion tension with the liquid of the continuous phase and a specific gravity materially greater than that of the liquid of the continuous phase.

3. The method of resolving an emulsion which comprises: intimately contacting with said emulsion grains of a solid iron compound substantially insoluble in any constituent of said emulsion, said compound having an adhesion tension with the liquid of the dispersed phase of said emulsion sufficient to give a specific rise ratio not substantially less than 2.5, and having a specific gravity materially greater than that of the liquid of the continuous phase.

4. The method of resolving an emulsion which comprises: intimately contacting with said emulsion grains of the mineral hematite, said grains having an adhesion tension with the liquid of the dispersed phase of said emulsion materially greater than their adhesion tension with the liquid of the continuous phase.

5. The method of resolving an oil-water emulsion in which water is the dispersed phase, which comprises: intimately contacting with said emulsion grains of a solid substance substantially insoluble in water and in oil, said solid having sufficient adhesion tension with water to cause a specific rise not substantially less than 200 mm. in 20 hours and a specific gravity materially greater than 1.0.

6. The method of resolving an oil-water emulsion in which water is the dispersed phase, which comprises: intimately contacting with said emulsion grains of a solid substance substantially insoluble in water and in oil, said solid having an adhesion tension with water sufficient to cause a specific rise not substantially less than 200 mm. in 20 hours, a specific gravity materially greater than 1.0, and a hardness not less than 4 on the scratch scale.

7. The method of resolving an oil-water emulsion in which water is the dispersed phase, which comprises: intimately contacting with said emulsion grains of a solid, oil and water insoluble compound of an element of the first transitional series, said compound having an adhesion tension with water sufficient to cause a specific rise not substantially less than 200 mm. in 20 hours and a specific gravity materially greater than 1.0.

8. The method of resolving an oil-water emulsion in which water is the dispersed phase, which comprises: intimately contacting with said emulsion grains of a solid, oil and water insoluble compound of an element of the first transitional series, said compound having an adhesion tension with water materially greater than its adhesion tension with oil and a specific gravity not substantially below 3.0.

9. The method of resolving an oil-water emulsion in which water is the dispersed phase, which comprises: intimately contacting with said emulsion grains of a solid, water and oil insoluble metallic oxid, said oxid having an adhesion tension with water sufficient to cause a specific rise not substantially less than 200 mm. in 20 hours and a specific gravity materially greater than 1.0.

10. The method of resolving an oil-water emulsion in which water is the dispersed phase, which comprises: intimately contacting with said emulsion grains of a solid, water and oil insoluble metallic oxid, said oxid having an adhesion tension with water materially greater than its adhesion tension with oil and a specific gravity as compared to water not substantially below 3.0.

11. The method of resolving an oil-water emulsion in which water is the dispersed phase, which comprises: intimately contacting with said emulsion grains of a solid, water and oil insoluble iron compound, said compound having an adhesion tension with water sufficient to cause a specific rise not substantially less than 200 mm. in 20 hours and a specific gravity materially greater than 1.0.

12. The method of resolving an oil-water emulsion in which water is the dispersed phase, which comprises: intimately contacting with said emulsion grains of a solid, water and oil insoluble iron compound, said compound having an adhesion tension with water materially greater than its adhesion tension with oil and a specific gravity not substantially below 3.0.

13. The method of resolving an oil-water emulsion in which water is the dispersed phase, which comprises: intimately contacting with said emulsion grains of the mineral hematite, said grains having an adhesion tension with water materially greater than their adhesion tension with oil.

14. The method of resolving an oil-water emulsion in which water is the dispersed phase, which comprises: intimately contacting with said emulsion grains of the mineral lepidolite, said grains having an adhesion tension with water materially greater than their adhesion tension with oil.

15. The method of resolving an oil-water emulsion in which water is the dispersed phase, which comprises: intimately contacting with said emulsion grains of the mineral hornblende, said grains being formed from the massive mineral and having an adhesion tension with water materially greater than their adhesion tension with oil.

16. The continuous method of resolving an oil-water emulsion in which water is the dispersed phase, which comprises: passing through said emulsion dispersed grains of a solid substance substantially insoluble in water and in oil, said solid having sufficient adhesion tension with water to cause a specific rise not substantially less than 200 mm. in 20 hours and a specific gravity materially greater than 1.0; collecting said grains, and returning the collected grains in masses to said emulsion to be again dispersed and to again pass therethrough.

17. The continuous method of resolving an oil-water emulsion in which water is the dispersed phase, which comprises: passing through said emulsion dispersed grains of a solid substance substantially insoluble in water and in oil, said solid having an adhesion tension with water sufficient to cause a specific rise not substantially less than 200 mm. in 20 hours, a specific gravity materially greater than 1.0, and a hardness not less than 4 on the scratch scale; collecting said grains, and returning the collected grains in masses to said emulsion to be again dispersed and to again pass therethrough.

18. The continuous method of resolving an oil-water emulsion in which water is the dispersed phase, which comprises: passing through said emulsion dispersed grains of a solid, oil and water insoluble compound of an element of the first transitional series, said compound having an adhesion tension with water sufficient to cause a specific rise not substantially less than 200 mm. in 20 hours and a specific gravity materially greater than 1.0; collecting said grains, and returning the collected grains in masses to said emulsion to be again dispersed and to again pass therethrough.

19. The continuous method of resolving an oil-water emulsion in which water is the dispersed phase, which comprises: passing through said emulsion dispersed grains of a solid, oil and water insoluble compound of an element of the first transitional series, said compound having an adhesion tension with water materially greater than its adhesion tension with oil and a specific gravity not substantially below 3.0; collecting said grains, and returning the collected grains in masses to said emulsion to be again dispersed and to again pass therethrough.

20. The continuous method of resolving an oil-water emulsion in which water is the dispersed phase, which comprises: passing through said emulsion dispersed grains of a solid, water and oil insoluble metallic oxid, said oxid having an adhesion tension with water sufficient to cause a specific rise not substantially less than 200 mm. in 20 hours and a specific gravity materially greater than 1.0; collecting said grains in masses, and returning the collected grains to said emulsion to be again dispersed and to again pass therethrough.

21. The continuous method of resolving an oil-water emulsion in which water is the dispersed phase, which comprises: passing through said emulsion dispersed grains of a solid, water and oil insoluble metallic oxid, said oxid having an adhesion tension with water materially greater than its adhesion tension with oil and a specific gravity as compared to water not substantially below 3.0; collecting said grains, and returning the collected grains in masses to said emulsion to be again dispersed and to again pass therethrough.

22. The continuous method of resolving an oil-water emulsion in which water is the dispersed phase, which comprises: passing through said emulsion dispersed grains of a solid, water and oil insoluble iron compound, said compound having an adhesion tension with water sufficient to cause a specific rise not substantially less than 200 mm. in 20 hours and a specific gravity materially greater than 1.0; collecting said grains, and returning the collected grains in masses to said emulsion to be again dispersed and to again pass therethrough.

23. The continuous method of resolving an oil-water emulsion in which water is the dispersed phase, which comprises: passing through said emulsion dispersed grains of a solid, water and oil insoluble iron compound, said compound having an adhesion tension with water materially greater than its adhesion tension with oil and a specific gravity not substantially below 3.0; collecting said grains, and returning the collected grains in masses to said emulsion to be again dispersed and to again pass therethrough.

24. The continuous method of resolving an oil-water emulsion in which water is the dispersed phase, which comprises: passing through said emulsion dispersed grains of the mineral hematite, said grains having an adhesion tension with water materially greater than their adhesion tension with oil; collecting said grains, and returning the collected grains in masses to said emulsion to be again dispersed and to again pass therethrough.

25. The continuous method of resolving an oil-water emulsion in which water is the dispersed phase, which comprises: passing through said emulsion dispersed grains of the mineral lepidolite, said grains having an adhesion tension with water materially greater than their adhesion tension with oil; collecting said grains, and returning the collected grains in masses to said emulsion to be again dispersed and to again pass therethrough.

26. The continuous method of resolving an oil-water emulsion in which water is the dispersed phase, which comprises: passing through said emulsion dispersed grains of the mineral hornblende, said grains being formed from the massive mineral and having an adhesion tension with water materially greater than their adhesion tension with oil; collecting said grains, and returning the collected grains in masses to said emulsion to be again dispersed and to again pass therethrough.

CHARLES J. ROBINSON.